United States Patent

Barker et al.

[15] 3,644,824
[45] Feb. 22, 1972

[54] POLAROGRAPH APPARATUS

[72] Inventors: Geoffrey Cecil Barker, Abingdon; Arthur William Gardner, Didcot; Anthony Gerald Pope, Reading, all of England

[73] Assignee: United Kingdom Atomic Energy Authority, London, England

[22] Filed: Feb. 9, 1970

[21] Appl. No.: 9,908

[52] U.S. Cl. .............................................. 324/31, 204/195
[51] Int. Cl. ..................................................... G01n 27/42
[58] Field of Search ..................... 324/31, 30, 29; 204/195 R, 204/195 H

[56] References Cited

FOREIGN PATENTS OR APPLICATIONS 870,451  6/1961  Great Britain ........................... 324/31

Primary Examiner—Michael J. Lynch
Attorney—Larson, Taylor & Hinds

[57] ABSTRACT

Polarographic cell impedance components which are potential dependent are detected by applying a high-frequency and a low-frequency voltage simultaneously across the cell. The variation in impedance produced by the low-frequency voltage results in amplitude modulation of the high-frequency current through the cell. The amplitude modulation is detected. The impedance components thus indicated comprise principally the faradaic impedance and the double-layer electrode capacity. The double-layer electrode capacity is compensated by inserting an inductor, preferably variable, in series with the cell so as to resonate at the high frequency with the double-layer electrode capacity.

7 Claims, 3 Drawing Figures

3,644,824

POLAROGRAPH APPARATUS

The invention relates to polarograph apparatus.

In polarograph apparatus, information is obtained about ions in solution by measurement of the variation with voltage applied across a polarographic cell of the electrical current passed by the cell.

In a simple form of polarograph apparatus, a stabilized direct voltage is applied across the cell and the resultant cell current is measured while the applied voltage is swept from zero up to a predetermined value at a constant rate. Such an apparatus, with the need for direct current amplification, suffers seriously from problems of drift. This has led to the design of polarograph apparatus employing alternating current techniques. Whilst solving the drift problem, the use of alternating current techniques introduces additional problems.

In particular, the impedance of a polarographic cell may be considered as having two main components termed faradaic and nonfaradaic. The faradaic impedance is that arising from any charge-transfer processes occurring at the indicator electrode at the mean direct voltage applied across the cell. It is this faradaic impedance which it is desired to measure in polarograph apparatus.

The remainder of the impedance of the cell is termed the nonfaradaic component of impedance.

This nonfaradaic component of impedance may be regarded as having two subcomponents, namely a resistive subcomponent and a capacitive subcomponent. In a cell of the dropping mercury electrode type, the resistive subcomponent of impedance originates from the double-layer capacity of the electrode. The resistive subcomponent of impedance is not dependent upon the voltage applied across the cell, but the double-layer capacity of the electrode is dependent upon this voltage.

The present invention is concerned with generating a signal complex across a polarographic cell from which the effects of the faradaic and nonfaradaic components of impedance in the cell may be separated and which discriminates the faradaic impedance due to reversible charge transfer processes from that due to irreversible charge transfer processes.

The invention provides a polarograph apparatus comprising a polarographic cell, a direct voltage generator connected to supply a direct voltage across the cell, a low-frequency voltage generator and a high-frequency voltage generator connected to supply respectively a low-frequency voltage and a high-frequency current to the cell so that the high-frequency voltage developed across the cell is amplitude modulated as a result of variations in cell impedance produced by the effect of the low-frequency voltage upon that component (or components) of the cell impedance which is (or are) potential dependent, and means for separating from the complex voltage developed across the cell a signal corresponding to the amplitude modulation due to the faradaic component of cell impedance.

The invention also provides a polarograph apparatus comprising a polarographic cell, a direct voltage generator connected to supply a direct voltage across the cell, a low-frequency voltage generator and a high-frequency voltage generator connected to supply respectively a low-frequency voltage and a high-frequency current to the cell so that the high-frequency voltage developed across the cell is amplitude modulated as a result of variations in cell impedance produced by the effect of the low-frequency voltage upon that component (or components) of the cell impedance which is (or are) potential dependent, and compensating means for compensating at least partially for the effect of that part of the potential dependent impedance component which is non-faradaic.

Specifically, in a polarograph apparatus comprising a polarographic cell with a dropping mercury electrode, the compensating means is adapted to compensate at least partly for the double-layer capacity of the dropping mercury electrode.

The said compensating means may simply comprise a differential arrangement in which there is provided a second polarographic cell containing pure supporting electrolyte and connected to be supplied with the same voltages and to operate in synchronism with the cell containing the ions to be investigated, the indicating information being derived from the difference between the amplitude modulation of the high-frequency voltages developed respectively across the two cells.

However, it is preferred, in accordance with the invention that the said compensating means comprises an inductive device connected in series with the cell, the inductance of the device being such as to form, with the capacitive impedance component to be compensated, a circuit resonant at the high-frequency voltage. In these circumstances, the amplitude modulation of the high-frequency voltage developed across the cell and inductive device combination will have no contribution, or a substantially reduced contribution, from the said capacitive impedance component.

The compensation is especially effective when the cell impedance contains a large resistive component. Improved compensation may be secured by inserting a resistor in series with the cell.

Preferably the direct voltage generator generates a direct voltage which increases linearly with time to provide a polarographic sweep. With a mercury dropping electrode, the double-layer capacity of the mercury electrode will vary as the direct voltage applied across the cell varies and it is therefore preferred to provide means for varying the inductance of the said inductive device.

Preferably there is provided detector means for detecting the relative phase of the high-frequency current and the high-frequency voltage developed across the series combination of the cell and inductive device, and control means, responsive to the output of the detector means, for varying the inductance of the said inductive device in such a manner as to tend to reduce difference in phase between the aforesaid high-frequency current and high-frequency voltage.

A specific construction of polarograph apparatus embodying the invention will now be described by way of example and with reference to the accompanying drawings in which.

Figure 1:
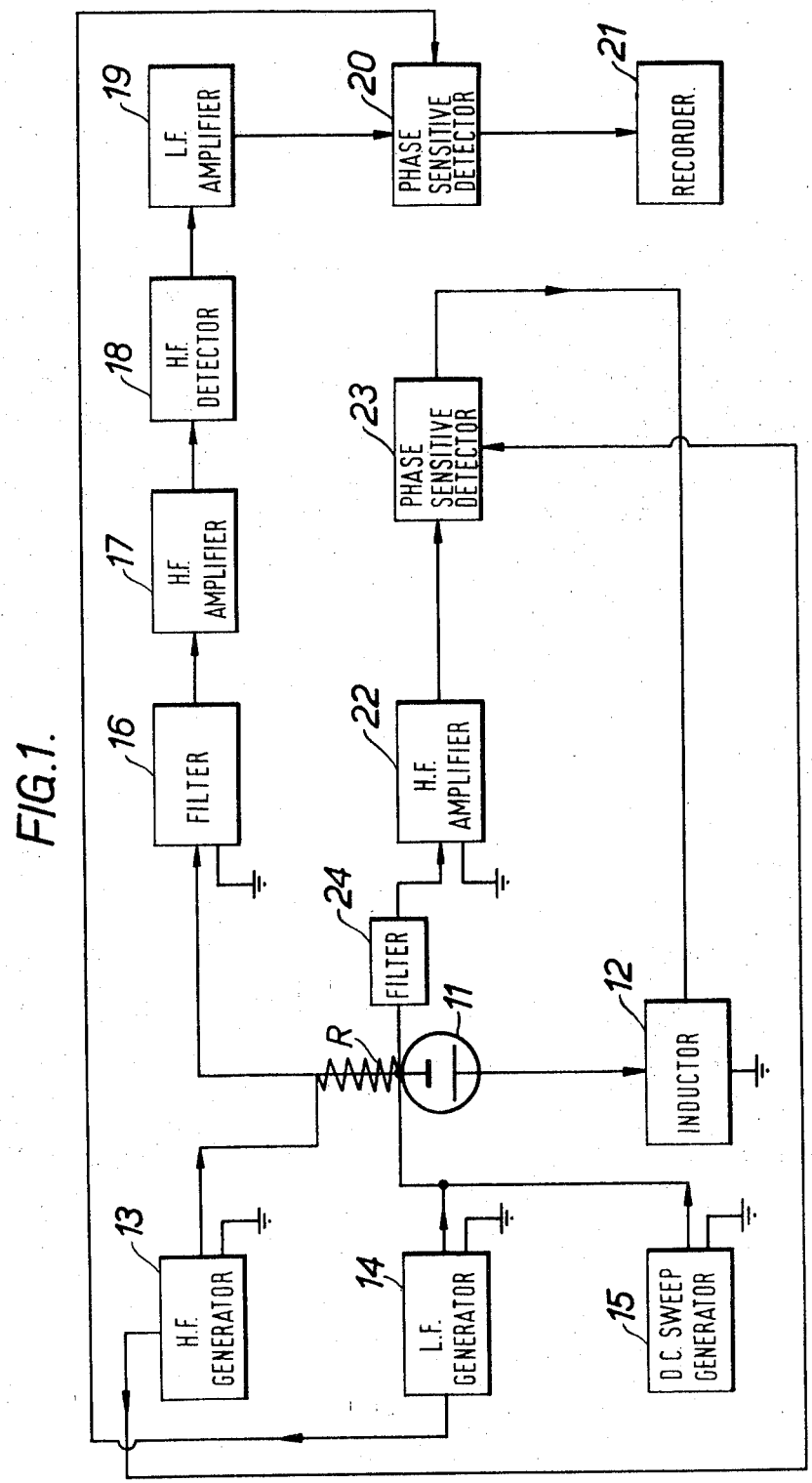
FIG. 1 is a block diagram of the apparatus.

The polarographic cell is indicated diagrammatically at 11 and comprises a container in which the electrolyte to be investigated lies between a mercury pool electrode at the bottom and a dropping mercury capillary electrode at the top.

Three electrical voltage generators are connected across the cell 11 and a series inductive device 12. A high-frequency generator 13 is connected via series resistor R whilst a low-frequency generator 14 and a direct voltage sweep generator 15 are connected directly across the combination of cell 11 and inductive device 12.

In this example, the frequency of the high-frequency generator 13 is from 20–200 kiloHertz and the frequency of the low frequency generator 14 is of the order of 200 Hertz.

The effect of the potential dependent impedance of the cell 11 (which includes both faradaic and nonfaradaic impedance components) is that the high-frequency voltage appearing across the cell 11 and inductor 12 is amplitude modulated. The modulation has the frequency of the low-frequency generator and the depth of modulation is dependent upon the variation with potential of the impedance of the series combination of the cell 11 and the inductive device 12.

The subcomponents of cell impedance which do not vary with the applied mean potential across the cell do not affect the modulation signal, so that by detecting the modulation signal and using it as indicator, these unwanted subcomponents are eliminated from the measurement.

In this example, the modulated high-frequency voltage developed across the combination of resistor R, cell 11 and inductive device 12 is fed via filter 16 to high-frequency amplifier 17, high-frequency detector 18 and low-frequency amplifier 19. The output from the low-frequency amplifier 19 is converted to a slowly changing voltage by a phase-sensitive detector 20 which drives a pen recorder 21. The phase-sensitive detector receives a reference phase signal direct from low-frequency generator 14.

As discussed above, the modulation signal is dependent upon those subcomponents of impedance of the combination of the cell 11 and inductive device 12 which are potential dependent. The potential dependent subcomponents of impedance of the cell 11 comprise the faradaic component and the capacitive nonfaradaic component, namely the double-layer capacity of the electrode.

The purpose of the inductive device 12 is to compensate for the double-layer capacity, thus removing its influence upon the modulation signal which thus becomes dependent substantially solely upon faradaic impedance of the cell 11.

In this operation, inductive device 12 may be regarded as a negative capacity effective to cancel any modulation of the high-frequency voltage across the cell which would otherwise appear due to the double-layer electrode capacity.

Figure 2:
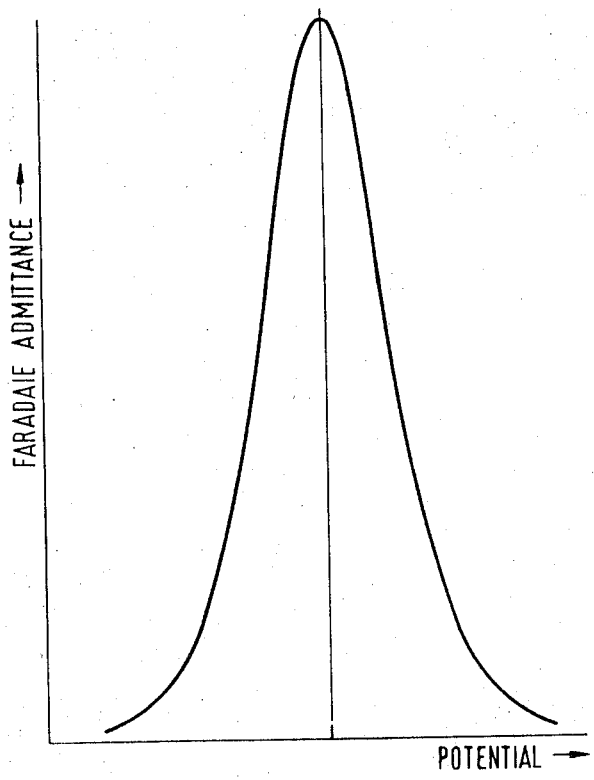
FIGS. 2 and 3 are graphs of characteristic curves of the apparatus.

For a more accurate explanation, consider the faradaic admittance of the cell measured at the high frequency. The variation of this admittance with potential is shown in FIG. 2. The depth of amplitude modulation of the high-frequency voltage developed across the cell will be approximately proportional to the derivative of the admittance with respect to potential if the low-frequency current is sufficiently small and the faradaic impedance is much larger than the high-frequency impedance of the double-layer electrode capacity.

Where the output impedance of the high-frequency generator is resistive, this latter condition is achieved in the combination of the cell 11 and inductive device 12 when the double-layer electrode capacity and the inductive device 12 together form a series resonant circuit at the high frequency.

It is desirable for the satisfactory operation of the apparatus as so far described for the internal resistance of the cell to be large compared with the interfacial impedance due to the double-layer electrode capacity. This condition is satisfied, in this example, by introducing a large resistance R in series with the cell 11 and inductive device 12, the modulated high-frequency voltage for detection being derived from across the series combination of resistor R, cell 11 and inductive device 12.

For any particular mean potential across the cell 11, a fixed inductance for inductive device 12 can be chosen so that the component of the modulation signal due to the voltage dependence of the double-layer electrode capacity is reduced to zero.

While acceptable results may be achieved with a fixed inductance of inductive device 12, a preferred, and more sophisticated, arrangement has been devised in which the inductance is varied during the voltage sweep of the polarograph in such a way as to hold the series combination of inductive device 12 and double-layer electrode capacity constantly at resonance for the high frequency.

To achieve this, in this example, the high-frequency voltage appearing across the cell 11 and inductive device 12 is applied via filter 24 and high-frequency amplifier 22 to a phase-sensitive detector 23 which receives a reference phase signal direct from the high-frequency generator 13.

The inductive device 12 has a variable inductance and is controlled by the signal output of the phase-sensitive detector 23, the arrangement of the control loop being such as to adjust the inductance of inductive device 12 in a sense tending to reduce phase difference between the high-frequency generator output and the high-frequency voltage across the series combination of the cell 11 and inductive device 12.

The inductive device 12 may comprise a fixed inductor with a parallel connected variable "resistance" device, such as a transistor.

Alternatively, the device 12 may comprise active circuits simulating an inductor. A further alternative is for the inductive device 12 to comprise a servo-controlled variable inductor.

Of these, the first mentioned arrangement is preferred as it is less electrically noisy than active circuits simulating an inductor and a servo-controlled variable inductor has a relatively slow response time and involves more complex equipment.

If the voltage applied by the sweep generator to the cell 11 is held constant, the recorder chart will merely show the variation with time of the faradaic modulation signal at constant mean potential. More usually the output voltage of the sweep generator 15 is arranged to change with time. If the rate of change of voltage is small and the indicator electrode is a rapidly dropping mercury electrode, the recorder chart will show the dependence of the faradaic modulation response on the mean value of the cell voltage. This response is also dependent on the size of the mercury drop and hence the output voltage applied to the recorder may tend to vary rapidly as the mercury drops grow and fall. It is then desirable to insert between the final detector 20 and the recorder 21 a sample and hold circuit which samples the detector output voltage at a predetermined time in the drop life and passes only the information thus acquired to the recorder. Alternatively the sweep voltage may be made to change rapidly with time and the voltage sweep (duration of the order of 4 seconds), although delayed somewhat (4 seconds delay), may be synchronized with the fall of the mercury drop. In this case an X-Y recorder can be used for recording the polarogram. For this, the signal from the sweep generator 15 is applied to one axis and the output voltage from the final detector 20 is applied to the other axis.

A circuit can, with advantage, be introduced to provide an increase in the amplitude of the low-frequency voltage applied to the drop during the period of the sweep, thereby compensating for the growth of the drop during this period. Without this compensation there would be a reduction in sensitivity as the sweep progresses, and hence a dependence on the starting potential of the delayed wave height. Ideally, this circuit should increase the amplitude of the low-frequency voltage in accordance with the two-thirds power of the time, but a linear increase can be arranged to lead to sensitivity variations of less than 1 percent for a sweep time equal to the delay between the start of growth of drop and the beginning of the sweep. Such compensation is not required if an electrode of constant surface area during the period of the sweep is employed.

Figure 3:
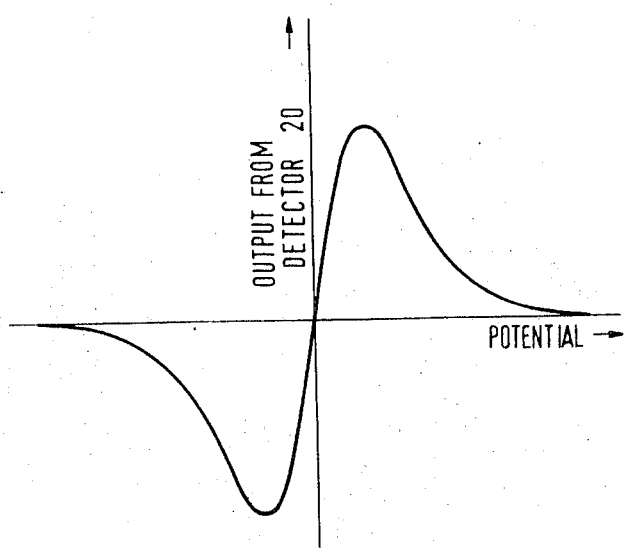

FIG. 3 illustrates the form of polarogram which may be obtained with the apparatus of this example. The form is the derivative of the faradaic admittance of the electrode process and has the advantage of providing greater resolution than signals of lesser differentiation.

In designing the apparatus of this example, the following factors have to be taken into consideration: The low-frequency voltage generated by low-frequency generator 14 may have any convenient cyclic form. However, it is preferable that the low-frequency voltage is sinusoidal, because the absence of higher harmonics facilitates the isolation of the high-frequency voltage developed across the series combination of resistor R, cell 11 and inductive device 12. The amplitude of the low-frequency voltage developed across the cell 11 may be a substantial fraction of the amplitude of the high-frequency voltage across the cell, subject to the physical limit that the depth of modulation may not exceed unity.

The output impedance of the high-frequency generator 13 is preferably larger than the resistance of resistor R and for the best performance, the output impedance should be wholly resistive.

If at the low frequency the internal resistance of the cell 11 is small in comparison with the impedance of the interface between the indicator electrode and the solution in the polarographic cell 11, the low-frequency component of the voltage developed across this interface is adequately controlled if the output impedance of the low-frequency generator is comparable with or smaller than the internal resistance of the cell. If the internal resistance of the cell is relatively large, it may be desirable to use a low-frequency generator with an output impedance much larger than the internal resistance of the cell. Whatever type of low-frequency generator 14 is employed it is important that, at the high frequency, this generator 14 should not shunt to an appreciable extent the series combination of the cell 11 and the inductive device 12. This requirement can be satisfied for example by inserting a parallel resonant circuit resonating at the high frequency in the connection between the low-frequency generator 14 and the cell 11.

Similarly, the direct voltage generator must not, at the high frequency, shunt the series combination of cell 11 and inductive device 12. A parallel resonant blocking circuit may be inserted between the direct voltage generator 15 and the cell 11.

The amplitudes of both the low and high-frequency component of the voltage developed across the interface between the indicator electrode and the solution will normally be of the order of 20 millivolts but larger amplitudes may be employed to obtain enhanced sensitivity if loss of resolution is not important.

The input impedance of filter circuit 24 should be entirely resistive, otherwise the phase of the unwanted modulation signal at the filter input may be affected and this will reduce the effectiveness of the feedback control of variable inductive device 12.

Detector 20 need not necessarily be phase sensitive, but this is preferable because the phase of the signal arriving at this detector often changes by 180° at or near the direct current polarographic half wave potential for a reaction. The phase-sensitive detector avoids or reduces discontinuities in the final output voltage consequent upon such phase changes and also makes for linearity between the final output voltage and the amplitude of the low-frequency voltage applied to the final detector.

An important advantage of the apparatus of the aforedescribed example is that it has very low sensitivity to irreversible charge transfer processes. Consequently, the apparatus may be used for the determination of low concentrations of reversibly reduced species in the presence of high concentrations of ions that experience irreversible reductions. For example, with the apparatus described, it is practicable to determine lead ions at a concentration of $2 \times 10^{-7}$M in an air-saturated solution.

The performance of the apparatus is limited by two factors, one of which is the inevitable noise level of the electronic circuits, the other being a response originating in the region of the dropping mercury electrode which is shielded by the capillary tip. This shielding response cannot be separated from the faradaic modulation signal. The response is greatest in solutions of low conductivity, at potentials at which the rate of change of double-layer electrode capacity is a maximum. The effect of the response on the polarogram is to distort the base line at the highest sensitivity of the polarograph. To compensate, at least partially for this effect, a circuit may be incorporated which introduces a counteracting slope to the trace, to render the base line level over the potential range of interest to the user. The shielding effect can be reduced by the use of supporting electrolytes of high conductivity and by the use of dropping mercury electrodes with tips having a minimum area of glass (or other insulating material) immediately adjacent to the drop surface.

In an alternative apparatus, instead of compensating for the double-layer capacity with the inductive device, a differential arrangement may be set up with two polarographic cells. One cell has the electrodes immersed in a pure supporting electrolyte while the other contains the ions to be investigated in solution in the supporting electrolyte. The difference between the modulation signals is amplified and recorded. In this way effects of the double-layer capacities of the two cells cancel one another.

The invention is not restricted to the details of the foregoing examples.

We claim:

1. A polarographic apparatus comprising a polarographic cell, a direct voltage generator connected to supply a direct voltage across the cell, a low-frequency alternating voltage generator connected to supply a low-frequency alternating voltage across the cell, a high-frequency alternating voltage generator connected to supply a high-frequency alternating current to the cell so that in operation the said direct voltage, the said low-frequency alternating voltage and the said high-frequency alternating current are each supplied independently to the cell, and such that the high-frequency alternating voltage developed across the cell is amplitude modulated as a result of variations in cell impedance produced by the effect of the low-frequency alternating voltage upon such component of the cell impedance as is potential dependent, means for separating from the complex voltage developed across the cell a signal corresponding to the amplitude modulation due to the faradaic component of cell impedance, and indicating means responsive to the said signal.

2. A polarographic apparatus comprising a polarographic cell, a direct voltage generator connected to supply a direct voltage across the cell, a low-frequency alternating voltage generator connected to supply a low-frequency alternating voltage across the cell and a high-frequency alternating voltage generator connected to supply a high-frequency alternating current to the cell so that in operation the said direct voltage, the said low-frequency alternating voltage and the said high-frequency alternating current are each supplied independently to the cell and such that the high-frequency voltage developed across the cell is amplitude modulated as a result of variations in cell impedance produced by the effect of the low-frequency voltage upon that component of the cell impedance which is potential dependent, compensating means included in the electrical circuit of the cell for compensating at least partially for the effect of that part of the potential dependent impedance component which is nonfaradaic and indicating means responsive to a signal derived from the said amplitude modulation as compensated by the compensating means.

3. A polarographic apparatus as claimed in claim 2, comprising a polarographic cell with a dropping mercury electrode, wherein the compensating means is adapted to compensate at least partly for the double-layer capacity of the dropping mercury electrode.

4. A polarographic apparatus as claimed in claim 3, wherein the said compensating means comprises an inductive device connected in series with the cell, the inductance of the device forming, with the capacitive impedance component to be compensated, a circuit resonant at the high-frequency voltage.

5. A polarographic apparatus as claimed in claim 4, wherein a resistor is inserted in series with the cell.

6. A polarographic apparatus as claimed in claim 3, wherein means is provided for varying the inductance of the inductive device.

7. A polarographic apparatus as claimed in claim 6, wherein there is provided detector means for detecting the relative phase of the high-frequency current and the high-frequency voltage developed across the series combination of the cell and inductive device, and control means, responsive to the output of the detector means, for varying the inductance of the said inductive device to reduce difference in phase between the aforesaid high-frequency current and high-frequency voltage.

* * * * *